United States Patent [19]

Frost et al.

[11] Patent Number: 4,698,885
[45] Date of Patent: Oct. 13, 1987

[54] METHOD FOR INSTALLING CONNECTING ROD BOLTS

[75] Inventors: Charles E. Frost, Cincinnati, Ohio; Rodney K. Elnick, Sterling Heights, Mich.

[73] Assignee: General Motors Corporation, Detroit, Mich.

[21] Appl. No.: 804,933

[22] Filed: Dec. 5, 1985

[51] Int. Cl.[4] .............................................. B23P 15/10
[52] U.S. Cl. .................................. 29/156.5 A; 29/525; 29/526 R
[58] Field of Search .............. 29/156.5 A, 525, 526 R, 29/252, 809

[56] References Cited

U.S. PATENT DOCUMENTS 2,411,364  11/1946  Butterfield .................... 29/156.5 A
4,138,780   2/1979  Jarmann.
4,176,439   4/1979  Jarmann.

Primary Examiner—Timothy V. Eley
Attorney, Agent, or Firm—Robert J. Outland

[57] ABSTRACT

A fixture and mechanism for guiding and installing body bound bolts in the bolt openings of engine connecting rods and the like. The device uses an air cylinder to advance an impact hammer driving push rods to engage the bolts. The air cylinder applies only a moderate force sufficient to advance the impact hammer to a position to impact the bolts. The impact force of the pneumatic air hammer is required to advance the bolts into press fitting engagement within the connecting rod openings. The method of using impact forces to drive the bolts into press fitting engagement while advancing the impact hammer with a lower force air cylinder accomplishes installation of the bolts with a relatively small and low cost fixture and equipment as described.

3 Claims, 5 Drawing Figures

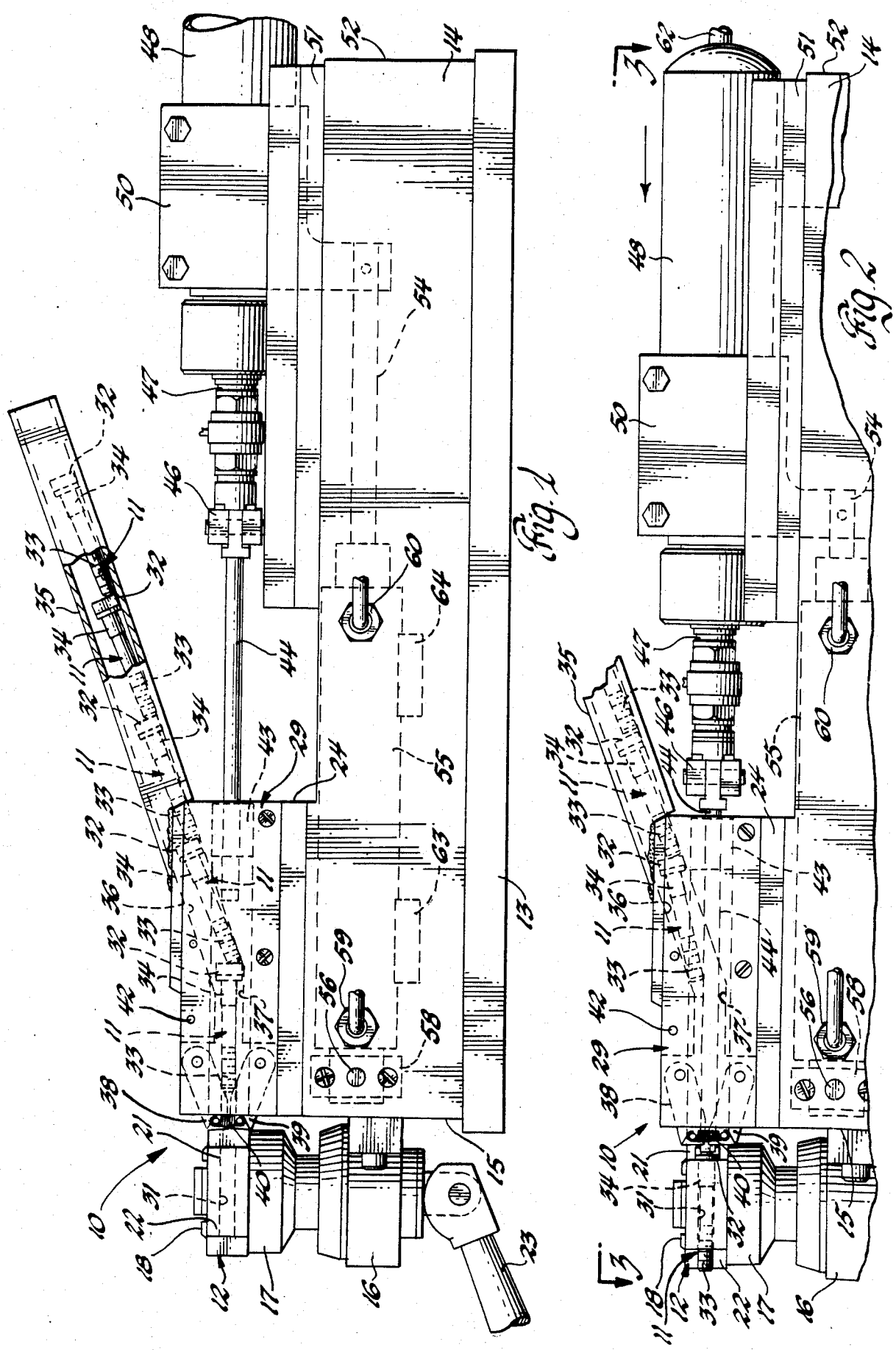

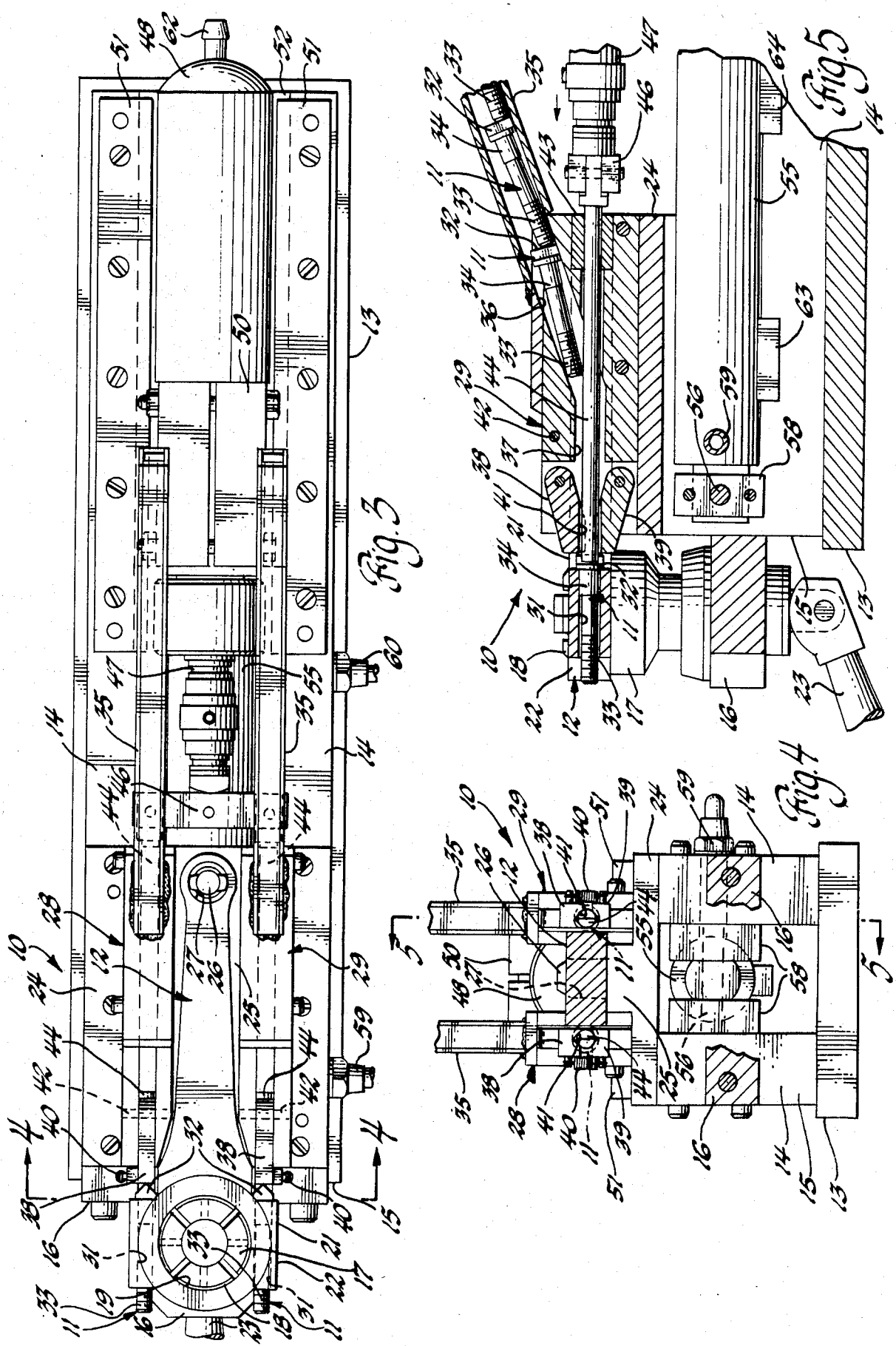

_4,698,885_

METHOD FOR INSTALLING CONNECTING ROD BOLTS

FIELD

This invention relates to a new apparatus and an improved method for installing bearing cap retention bolts in connecting rods for engines and the like.

BACKGROUND

The assembly of body bound cap retention bolts into a connecting rod generally requires (1) the alignment and insertion of the bolts into openings provided on either side of the rod large end and (2) the subsequent forcing of enlarged body portions of the bolts into the openings in a press fit. High production machinery for accomplishing these purposes commonly involves a sequence of steps which may be performed at more than one location. A high pressure hydraulic press may be used to force the bolt body portions into their press fitted engagement with the connecting rod openings. Separately machined connecting rod caps are usually also assembled to the rods during this operation prior to final machining of the crankshaft journal bearing and piston pin openings.

In general the prior machinery is relatively large and expensive and is usually designed to accept only one size or style of connecting rod for bolt installation. The provision of smaller, simpler and more easily adjustable apparatus for connecting rod bolt assembly was desired. In addition a mechanism was required that would be adaptable to the assembly of bolts in connecting rods having integral cap portions which are fully machined and are to be subsequently separated.

INVENTION SUMMARY

The present invention provides an assembly apparatus and method having the desired advantages. The apparatus includes an assembly fixture for supporting a connecting rod and feeding bolts to be installed to the premachined cap openings. One or more pneumatic hammers are preferably used to impact push rods that drive home the bolts and an air cylinder is provided to advance the pneumatic hammer(s) and push rods to engage and seat the bolts.

The assembly method, including the use of a pneumatic hammer rather than a hydraulic press, substantially reduces the size of the apparatus required. In addition the use of a relatively inexpensive head to mate with the bolts and be driven by the pneumatic hammer allows flexibility for changing to other connecting rod designs at a relatively low cost.

These and other features and advantages of the invention will be more fully understood from the following description of a preferred embodiment taken together with the accompanying drawings.

DRAWINGS

In the drawings:

FIG. 1 is a side view of a connecting rod bolt assembly apparatus in position for the installation of bolt means into an integral connecting rod and cap.

FIG. 2 is a side view similar to FIG. 1 but showing the apparatus after completion of the bolt installation step.

FIG. 3 is a top view of the apparatus in the position of FIG. 2 as viewed from the plane indicated by the line 3—3.

FIG. 4 a transverse cross-sectional view through the push rod guide portions at one end of the apparatus as viewed from the plane indicated by the line 4—4 of FIG. 3, and FIG. 5 is a longitudinal cross-sectional view of a portion of the apparatus as seen from the plane indicated by the line 5—5 of FIG. 4.

DESCRIPTION

In the drawings, numeral 10 generally indicates a connecting rod bolt assembly apparatus or fixture made in accordance with the invention for the assembly of connecting rod body bound bolts 11 into premachined connecting rods 12 having wrist pin and crankpin ends, the latter including integral caps to be subsequently separated. Fixture 10 was specifically designed as a bench test assembly device but is adaptable with suitable modifications for use in conjunction with permanently mounted production assembly machinery, transfer equipment and the like.

The fixture 10, as illustrated, includes a plate-like base 13 having supported thereon a pair of longitudinally extending upstanding side rails 14. At one end of the fixture, which will be identified for convenience as the front end 15, a support member 16 is secured to the ends of the side rails 14. The support member 16 carries an expanding arbor 17 having an upwardly extending cylindrical end 18 adapted to receive the crankpin end bearing bore 19 at the crankpin end of a connecting rod workpiece 12.

The connecting rod 12 is of a premachined type which includes a body 21 and an integral bearing cap 22 at the crankpin end to be subsequently separated by any suitable method. Such an integral rod and cap and a method of fracture separation of the cap, preferably after installation of the cap retention bolts, are disclosed in U.S. Pat. No. 4,569,109 issued Feb. 11, 1986 in the name of Mohamed A. Fetouh, and assigned to the assignee of the present invention.

The arbor 17 includes internal means, not shown, which expand to engage the bore 19 and hold the workpiece in position. In the illustrated embodiment, the expanding arbor is manually actuated by a cam handle 23 although it is apparent that automatic power actuation could be provided in a production arrangement.

On top of the side rails 14 at the front end 15 of the fixture, there is mounted a connecting rod workpiece carrier 24 having a raised central surface 25 from which there extends, at the end distal from the arbor 17, a guide pin 26. The pin 26 is received within the piston pin bore 27 at the wrist pin end of a connecting rod workpiece 12 to laterally engage and position the wrist pin end of the connecting rod.

Feed and guide means 28, 29 are mounted on the carrier along either side of the raised surface 25 to provide for delivering and guiding body bound bolts 11 into position in the fixture to be inserted into bolt openings 31 provided on either side of the bore 19 at the connecting rod large crankpin end. The openings 31 and bolts 11 differ from the corresponding elements illustrated in the previously mentioned U.S. Pat. No. 4,569,109 in that the openings 31 and bolts 11 extend completely through the rod crankpin end beside the bore 19. The bolts include heads 32 and threaded ends 33 with intermediate body portions 34 that are enlarged for press fitting into the openings 31. The threaded ends 33 are adapted to receive nuts, not shown, to retain in place the connecting rod cap 22 when separated from the body 21.

Each of the guide means 28, 29 includes a pivotally mounted guide tube 35 adapted to gravity feed a plurality of bolts 11 to a connecting passage 36 that intersects a bolt and push rod receiving horizontal guideway 37 Escapement means each including an upper jaw 38 and lower jaw 39 resiliently urged toward one another by springs 40 are carried by the guide means 28, 29 near the front end 15 of the fixture. The jaws 38, 39 define guide openings 41 which are aligned with the bolt openings 31 in the connecting rod workpieces to align the ends of bolts presented for assembly into the connecting rod.

The guide tubes 35 are pivotally movable around supporting pins 42 to allow opening to the interior of the passages 36 and guideways 37, the tops of which are formed by the guide tubes 35, thereby allowing inspection of the passages and the mechanism and the removal of damaged bolts. The guide means 28, 29 further include sleeve bearings 43 located in the guideways 37 distal from the connecting rod openings 31 and into which extend the operative ends of push rods 44. At their opposite ends, the push rods connect with a yoke 46 which extends laterally between the push rods and connects them with the rod 47 of an air hammer 48. The air hammer is carried on a slide 50 which is reciprocably supported on slotted guide rails 51 mounted on the side rails 14 near the rear end 52 of the fixture 10.

The slide 50 carrying the air hammer is, in turn, connected to the extendable rod 54 of an air cylinder 55. This cylinder is located between the side rails 14 toward the front end 15 of the fixture, extending below the feed and guide means, Preferably, a dowel pin 56 connects the air cylinder through associated supports 58 to the side rails 14. Suitable front and rear air connections 59, 60, respectively, are provided for the air cylinder and an end air connection 62 is provided on the impact air hammer 48. These air connections 59, 60, 62 are connected through suitable means, not shown, to any suitable control and air supply and exhaust means for operating the air cylinders and impact hammer in the manner to be subsequently described.

In operation, the base 13 may be mounted upon a table or be fixed as part of a larger manufacturing and assembly machine, a portion of which may act as the base. Bolts 11 fed into the guide tubes 35 are carried downward by gravity into the passages 36 and guideways 37. The foremost bolt 11 in each guideway 37 is advanced by the following bolts into engagement with the escapement jaws 38, 39 associated with either guideway.

Air is supplied to the impact air hammer 48 and to the control means, not shown, for the air cylinder 55, the air cylinder being in its extended position so that the impact hammer 48 is retracted to the rear 52 of the fixture as shown in FIG. 1. In this position the push rods 44 are withdrawn to the rear of the guideways 37, leaving the guideways open for advancement of bolts 11 into the positions shown in FIG. 1.

A workpiece in the form of a connecting rod 12 is then inserted into the fixture with the crankpin bore 19 received over the cylindrical end 18 of the expanding arbor 17 of the fixture and the piston pin bore 27 received over the guide pin 26 of the fixture. The expanding arbor 17 is then actuated by pivoting the cam handle 23 to expand the arbor and hold the connecting rod 12 in position within the fixture with the connecting rod bolt openings 31 aligned with the guide openings 41 of the escapement jaws 38, 39. It should be noted that, instead of the cam handle 23, suitable pneumatic or otherwise actuated means could be provided for operating the expanding arbor 17.

Upon locking of the connecting rod into position, as shown in the drawings, air is supplied to the rear connection 60 of the air cylinder causing the piston rod to move forward and draw with it the slide 50 carrying the air hammer 48. This advances the push rods 44 into engagement with the heads 32 of the foremost bolts 11. The engaging ends of the push rods 44 and the heads 32 are preferably configured to provide mating surfaces which allow the push rods to align the head ends of the bolts 11 within the guideways 37.

As the air hammer 48 is advanced further, the push rods 44 force the threaded ends 33 of the bolts 11 to open the jaws 38, 39 of the escapement means and pass through their guide openings 41 into the associated openings 31 of the connecting rod until the enlarged body portions 34 of the bolts are reached which require press fitting into the respective openings 31. At this point, the resistance offered by the press fitting of the bolts 11 into the openings 31 becomes greater than the force provided by the air cylinder to advance the impact hammer.

At that time, however, the impact hammer is triggered by the increased force to impact against the yoke 46 and the connected push rods 44 which transmit these impact forces to the bolts 11. The impact forces provided by the air hammer thus drive the bolts 11 into the openings 31 with the enlarged body portions 34 being in press fitting relation with the openings 31. During this seating of the bolts, the air cylinder 55 continuously supplies a force to advance the air hammer as the bolts are driven forward incrementally by the impact forces into their seated positions.

Suitable means, such as a limit switch 63, is provided to cut off the air to the rear air cylinder connection 60 and supply air to the front connection 59 when the bolts have been advanced to or near to their seated positions. This causes the air cylinder rod 54 to extend and return the air hammer 48 to the initial position shown in FIG. 1. At this location, a second limit switch 64 is provided to cut off the retracting air supply to the front connection 59 and the air hammer remains in the retracted position, allowing a new set of bolts 11 to move forward into the positions shown in FIG. 1. At this time, the connecting rod workpiece with its installed bolts may be removed from the fixture and a new workpiece inserted and the cycle may be repeated in the manner previously described.

It may now be appreciated that by the use of the previously described fixture, working components and assembly method, body bound bolts may be easily installed into connecting rods in a production operation. The operation may be mechanized to the degree desired using relatively moderate air cylinder forces aided by an impact hammer to allow the low force air cylinder to advance the bolts into their seated positions. Obviously, the described embodiment of the invention represents only one form in which the novel concepts may be found and applied as it will be understood that the various features of the mechanism may be modified or substituted for without necessarily departing from the inventive concepts described.

For example, dual air hammers could be used instead of a single hammer connected by a yoke with two push rods. Additionally, the various guide, feed, clamping and other structures illustrated could be modified within the skill of the art without departing from the invention. Accordingly, the invention should not be limited to the disclosed embodiment but should have the full scope permitted by the language of the following claims.

The embodiments of the invention in which an exclusive property or privilege is claimed are defined as follows:

1. A method for mechanically inserting and seating a body bound bolt in a connecting rod having opposite ends, one of which includes a sized journal recess and at least one bolt opening, said bolt having a threaded end of smaller diameter than said bolt opening, an adjacent body portion sized for a press fit into the bolt opening and a head opposite the threaded end, said method comprising the steps of:

mechanically aligning the bolt with the bolt opening;

engaging the bolt head with movable impact means and mechanically applying a seating force on the impact means, the seating force advancing the bolt threaded end into the bolt opening and urging the body portion against the bolt opening but inadequate to cause a press fit thereof; and mechanically applying to the bolt head with the impact means repeated impact forces adequate to force the body portion into the opening with a press fit while maintaining the seating force on the impact means to seat the bolt head against the connecting rod one end with the bolt body portion press fitted in the opening.

2. A method for mechanically inserting and seating body bound bolts in a connecting rod having opposite ends, one of which includes a sized journal recess and a pair of bolt openings, said bolts having threaded ends of smaller diameter than said bolt openings, adjacent body portions sized for press fitting in the bolt openings and heads opposite their threaded ends, said method comprising the steps of:

mechanically aligning the bolts with the bolt openings;

engaging the bolt heads with impact means and mechanically applying a seating force on the impact means, the seating force advancing the bolt threaded ends into the bolt openings and urging the body portions against the openings, but being inadequate to cause a press fit thereof; and mechanically applying to the bolt heads with the impact means repeated impact forces adequate to force the body portions into the openings with a press fit while maintaining the seating force on the impact means to seat the bolt heads against the connecting rod one end with the bolt body portions press fitted in their associated openings.

3. A method as in claim 2 wherein said connecting rod one end includes an integral cap for subsequent separation from the rod and said recess is a complete opening, said threaded bolt ends, upon assembly, extending beyond the cap to allow the loose application of nuts thereon to retain the cap in place after its separation.

* * * * *